United States Patent
He et al.

(10) Patent No.: US 8,422,450 B2
(45) Date of Patent: Apr. 16, 2013

(54) RELAXED DETERMINISTIC BACK-OFF METHOD FOR MEDIUM ACCESS CONTROL

(75) Inventors: Yong He, Beijing (CN); Xiao-Jun Ma, Beijing (CN); Jun Li, Princeton, NJ (US); Charles Chunaming Wang, Philadelphia, PA (US)

(73) Assignee: Thomson Licensing, Issy les Moulineaux (FR)

( * ) Notice: Subject to any disclaimer, the term of this patent is extended or adjusted under 35 U.S.C. 154(b) by 411 days.

(21) Appl. No.: 12/934,364

(22) PCT Filed: Mar. 25, 2009

(86) PCT No.: PCT/US2009/001855
§ 371 (c)(1),
(2), (4) Date: Sep. 24, 2010

(87) PCT Pub. No.: WO2009/120332
PCT Pub. Date: Oct. 1, 2009

(65) Prior Publication Data
US 2011/0007703 A1    Jan. 13, 2011

(30) Foreign Application Priority Data
Mar. 26, 2008    (EP) .................................... 08300154

(51) Int. Cl.
*H04W 4/00*    (2009.01)

(52) U.S. Cl.
USPC .......................................................... 370/329

(58) Field of Classification Search .................. 370/329, 370/338, 348, 444, 458, 447, 461, 337, 347, 370/442, 445, 446, 448
See application file for complete search history.

(56) References Cited

U.S. PATENT DOCUMENTS

| | | | |
|---|---|---|---|
| 5,963,560 A | 10/1999 | Kalkunte | |
| 6,215,792 B1* | 4/2001 | Abi-Nassif | 370/458 |
| 2002/0071449 A1 | 6/2002 | Ho et al. | |

FOREIGN PATENT DOCUMENTS

| | | |
|---|---|---|
| EP | 1296484 A1 | 3/2003 |
| EP | 1739891 A1 | 1/2007 |
| GB | 2419497 A | 4/2006 |

OTHER PUBLICATIONS

European Search Report for EP08300154 dated Oct. 17, 2008.

* cited by examiner

*Primary Examiner* — Chi Pham
*Assistant Examiner* — Alexander O Boakye
(74) *Attorney, Agent, or Firm* — Robert D. Shedd; Jeffrey M. Navon; Catherine A. Cooper (57) ABSTRACT

A method and apparatus are described including transmitting data if a slot count is equal to a triggering event, selecting a new triggering event responsive to a failed data transmission and replacing the triggering event with the new triggering event.

13 Claims, 4 Drawing Sheets

RELAXED DETERMINISTIC BACK-OFF METHOD FOR MEDIUM ACCESS CONTROL

This application claims the benefit, under 35 U.S.C. §365 of International Application PCT/US2009/001855, filed 25 Mar. 2009, which was published in accordance with PCT Article 21(2) on 1 Oct. 2009 in English and which claims the benefit of European Application No. EP08300154.5, filed 26 Mar. 2008.

FIELD OF THE INVENTION

The present invention relates to wireless communications and, in particular, to a decentralized wireless medium access control method for multimedia applications

BACKGROUND OF THE INVENTION

The popularity of voice and video applications over mobile computing devices has raised concerns regarding the performance of medium access control (MAC) protocols, which are responsible for allocating shared medium resources to multiple communicating stations and resolving collisions that occur when two or more stations access the medium simultaneously. In the current IEEE 802.11 wireless LANs, the distributed coordination function (DCF) of the MAC protocol layer uses a binary exponential back-off (BEB) algorithm for fundamental channel access. The BEB algorithm mitigates the issue of network collisions by randomizing the timing of medium access among stations that share the communication medium. However, as demonstrated by both practical experience and theoretical analysis, the BEB algorithm has some deficiencies. First, the collision probability for a transmission attempt increases exponentially with the number of active stations in the network, which significantly impairs the network throughput for large-scale networks. Second, the medium access delay cannot be bounded and the jitter is variable, which may not be suitable for multimedia applications. Third, the opportunity for medium access is not fair among stations. That is, a given station may gain access to the communication medium and get served for a long time. This results in other stations having to greatly defer their access to the medium. Moreover, it turns out that the use of doubling the contention window upon failed transmissions appears to give more transmission opportunities to these successful stations.

The concept of reducing or eliminating contention in contention-based networks was introduced by the present Applicants using a form of round robin scheduling in an earlier patent applications PCT Application Serial Numbers PCT/US2007/014607 and PCT/US2007/014608. This concept works well in contention-based networks where there is a centralized controller or coordinator, which can be the global repository of knowledge and equally importantly disseminate and distribute that global knowledge in order to coordinate the activities of the nodes or stations of the network.

The earlier applications described a back-off method that sought to improve the performance of the legacy random back-off procedure. The method adopted a different approach to resolve external collisions. Deterministic values were selected for the back-off slot counts. Thus, there was no duplication among distributed slot counts and each station could exclusively access the medium without colliding with others. By cycling the slot count though a fixed interval [0, N], where N was the number of stations in the network, the method offered a round robin type service among the stations. Therefore, the method provided guaranteed fairness for the network, and furthermore analysis showed that the method had high network efficiency for moderate to heavy traffic loads. The round robin type service cycling through the N stations amounted to scheduling stations such that each station received a fair amount of time. The stations could be mobile or fixed and the network could be wired or wireless. However, the station might also have been stationary and the network could have been any contention-based network. That invention was directed to any contention-based network where the station used a physical or virtual carrier sense mechanism to determine if the network was busy. This included any networks whose MAC layer protocol builds on CSMA, such as cable networks. Note that the term "slot" in the following text may refer to a period of uninterrupted frame exchange (a busy time slot), or a fixed duration for physical carrier sensing (an idle time slot).

A major feature of the method was that, under saturated traffic scenarios, the time interval/period between successive frame exchange sequences initiated by two separate stations was only one Distributed coordination function Inter-Frame Slot (DIPS) plus one slot time. Such an inter-space time interval/period was shorter than that of conventional random back-off methods used by DCF/EDCA (Enhanced Distributed Channel Access), but longer than the Point Coordination Function (PCF) time interval/period that is used by the PCF/HCCA (Hybrid coordination function (HCF) Controlled Channel Access) mechanism. Moreover, the method regulated a sequential service order among the stations, while conventional random back-off methods did not have such a feature. As used herein, "/" denotes alternative names for the same or similar components or structures. That is, a "/" can be taken as meaning "or" as used herein.

Network collisions are an annoying issue for the CSMA based wireless communications, as collisions greatly degenerate network performance, particularly in terms of throughput and network efficiency. However, collisions are eliminated (or greatly reduced) in the deterministic back-off (communication medium access) method of Applicants' earlier applications. Each station could exclusively take control of the communication medium after its slot count reached zero. In this sense, the deterministic back-off method outperformed legacy random back-off methods. An alternative embodiment included an option of inserting a station/node into the round robin service schedule more than once per round. This alternative embodiment permitted a form of prioritization.

Figure 1:
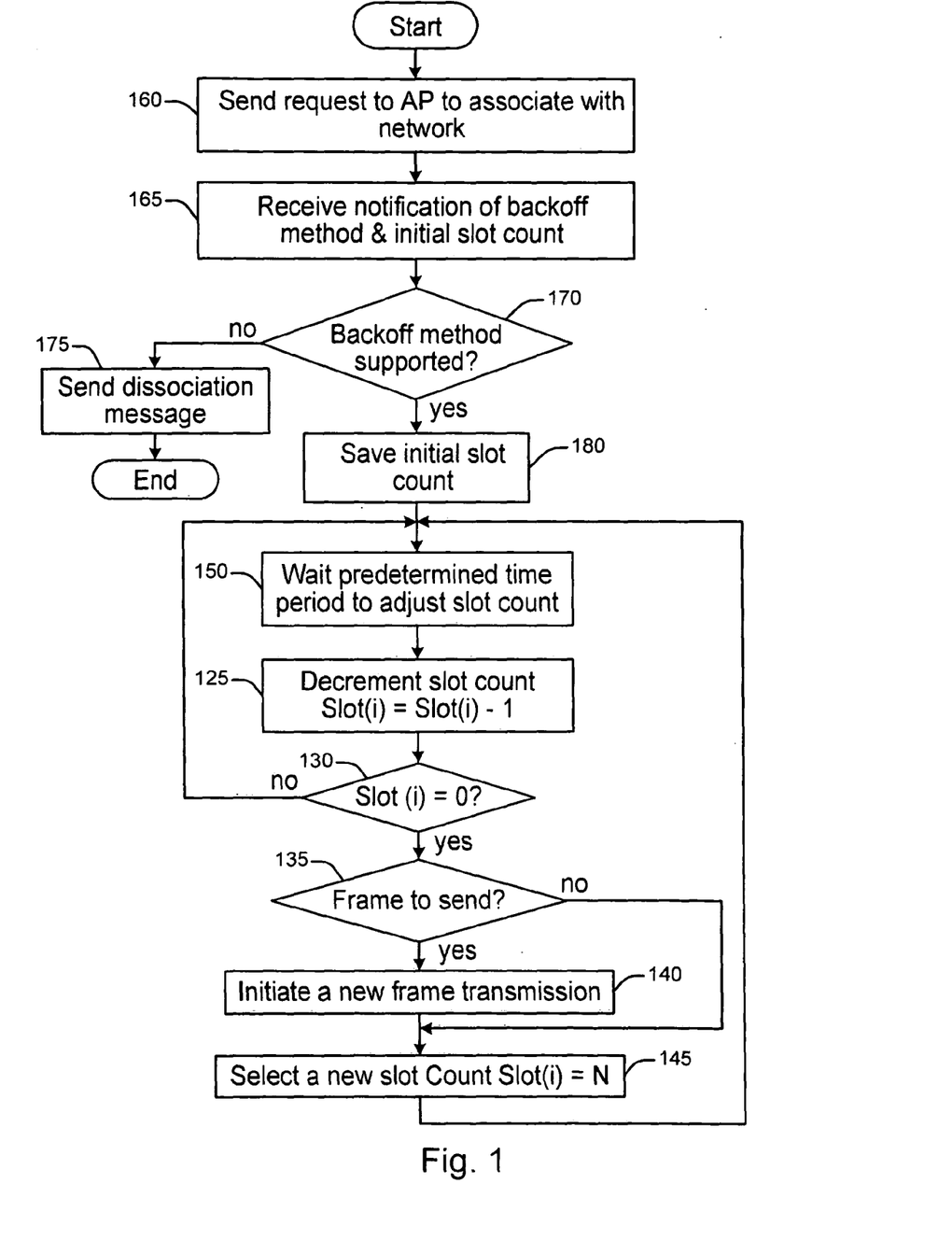
FIG. 1 is a flowchart of the deterministic back-off method.

FIG. 1 shows the schematic diagram of the deterministic back-off method of Applicants' earlier applications. A mobile station i running the deterministic back-off method decrements its slot count slot(i) whenever the medium has been sensed to be idle for a DIFS time. It should be noted that the number of slots is in general equal to the number of station/nodes. In the alternative embodiment where a form of prioritization was described, the slot count was greater than the number of stations/nodes to accommodate insertion of a given station/node more than once in the schedule of round robin service. When the slot count slot(i) reaches zero and there is a frame pending in the transmission queue, station/node commences frame transmission. The slot count determined when the mobile station needed to restart the slot counter for a new round of service was calculated deterministically using the deterministic back-off method using the following two equations:

$$\mathrm{slot}(i) = C_0(i, t, \vec{x}) \qquad (1)$$

$$\mathrm{slot}(i) = C_1(i, t, \vec{x}) \qquad (2)$$

where i is the station ID, t is the current time and $\vec{x}$ is the state variable vector that represents information necessary for the decision. The first equation is used for a station to access the network for the first time after successful association with the network. The second equation is used in subsequent iterations. Both $C_0(i, t, x)$ and $C_1(i, t, x)$ are deterministic functions that given the value of i, t and $\vec{x}$, a unique value for each station is derived as the output. Thus, at this step, instead of selecting the slot count slot(i) randomly within a contention window as in the BEB algorithm, the slot count is reset to a deterministic value according to equations (1) and (2).

FIG. 1 is a flowchart of the operation of the deterministic back-off method of Applicants' earlier applications from the perspective of the station. At 160 the joining station sends a request to join the network to the AP. The joining station then waits until it receives the communications medium access (deterministic back-off) method from the AP, as well as the slot count, the number of stations in the network and the address queue at 165. At 170, the joining station determines if it supports the communication medium access (deterministic back-off) method used by the network. If the joining station determines that it supports the communication medium access method then it saves the slot count, the address queue and the number of stations in the network at 180. The station proceeds as described above to gain access to the communication medium in accordance with the principles of the present invention. If the joining station determines that is does not support the communication medium access method of the present invention then it sends the PA a dissociation message at 175. Of course, if the joining station is already a member of (associated with) the network then 160, 165, 170, 175 and 180 are skipped/not executed. If the joining station is already associated with the network then the AP waits a predetermined time period at 150. The slot count is adjusted at 125. In an exemplary embodiment the slot count is decremented by one. An adjustment that is incremented could also be used. The slot count is compared to a predetermined value at 130. The exemplary embodiment of FIG. 1 compares the adjusted (decremented) slot count to 0. If the slot count has reached the predetermined value then at 135 the station determines if the station has a data frame to transmit. If the station has a data frame to transmit then data frame transmission is initiated at 140. If the station does not have a data frame to transmit then the station skips its turn and selects a new slot count at 145. Once data frame transmission has been initiated then the station selects a new slot count at 145. If the slot count had not reached the predetermined value at 130, then the station waits a predetermined time period at 150.

In the deterministic back-off method of the earlier applications, a new round of back-off was invoked whenever the slot count was decremented to zero, regardless of the status of pending transmission queue. When the slot count reached zero but there was no data to send, the station would forgo its transmission opportunity and go to the next round of back-off by re-setting the slot count according to equation (2). This mechanism was introduced to preserve the relationship between the distributed slot counts during the network's operation.

Functions $C_0(i, t, \vec{x})$ and $C_1(i, t, \vec{x})$ were carefully designed to derive appropriate values when setting the slot count. In that design, at any time, all the slot count values in the network formed a set whose cardinality was equal to (or greater than if prioritization is offered) the number of stations. Considering the efficiency of the algorithm in terms of network utility, the maximum element of the set S (denoted as max(S)) was set to a value as small as possible. In one of the implementations, both functions were chosen as constant functions with the constant being the number of stations/nodes associated with the network. That is, $$C_0(i,t,\vec{x})=N \qquad (3)$$

$$C_1(i,t,\vec{x})=N \qquad (4)$$

The deterministic back-off method based on equations (3) and (4) formed a round robin service among stations. FIG. 2 gives an exemplary illustration of the first embodiment. In view of the shared network medium, each time slot is assigned to a specific station. The time slot served as the entry for that station to access the medium. A medium access opportunity is granted to a station whenever its slot count was decremented to zero. Thus, the transmission opportunity is passed around the stations/nodes in a round robin manner. During each round of service, a station/node is granted exactly one opportunity for data transmission. If at that time it has no pending data in its transmission buffer, it forgoes the transmission opportunity, and another station with next higher slot count takes over the opportunity in the next time slot.

In an alternative embodiment, however, while max(s) was set as small as possible, max(s) may be greater than the number of stations/nodes in order to permit insertion of a given node(s)/station(s) into the round of service more than once and thereby provide a form of prioritization.

However, there are some deficiencies when applying the DEB algorithm for medium access in IEEE 802.11 wireless LANs. First, the DEB algorithm is not compatible with traditional medium access control methods that are based on the random BEB algorithm. Second, the DEB algorithm is sensitive to the physical sensing errors as those errors may lead to unsynchronized shifting of the slot counts and, thus, corrupt its operations. Third, frequent station joining and leaving may place a great burden on the central coordinator as those activities will cause loss of information synchronization over the network. Fourth, the operation of DEB algorithm relies on the central infrastructure for management and coordination, which limits its application scope and degrades its scalability.

SUMMARY OF THE INVENTION

To overcome the above-identified problems, a new back-off method is described herein—relaxed DEB (R-DEB). The R-DEB method improves the DEB algorithm in two ways. First, the R-DEB method fixes the back-off window to a predefined value. Second, the R-DEB method changes the frame transmission triggering condition by permitting multiple transmission opportunities when the back-off slot counters counts down from maximum to minimum. Randomization is introduced in the R-DEB algorithm during the selection of the triggering set. This enhances its robustness against physical sensing error and increases the management flexibility, at the cost of a slight degradation of network efficiency. The method of the present invention is backward compatible with legacy IEEE 802.11 standards. A frame is a unit of data. That is, data can be packaged in packets or frames or any other convenient format. As used herein a frame is used to indicate data packaged in a format for transmission.

A method and apparatus are described including transmitting data if a slot count is equal to a triggering event, selecting a new triggering event responsive to a failed data transmission and replacing the triggering event with the new triggering event.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Some concepts/terms that may benefit the understanding of the present invention are provided. A back-off round/stage is a procedure in which the back-off slot counter counts down from an initial value (maximum) to a critical value (minimum). When the counter reaches the critical value, a new transmission is attempted. One frame transmission may involve multiple back-off rounds/stages (because of unsuccessful transmission attempts). As used herein a time slot represents a continuous time period during which the back-off slot counter is frozen. It may refer to either a fixed time period (usually several microseconds) sufficient for the physical layer to perform the carrier sensing once, or a varying time period (usually between hundreds of microseconds to several milliseconds, depending on the length of the packet and physical data rate) when a frame is being transmitted over the shared medium. In a network with shared medium, each station freezes or decreases its back-off slot counter based on the resulting status of the physical or virtual carrier sensing of the medium. Hence, because of the shared nature of the medium, the slot count changes are aligned among the stations. The time slot can be used as a basic time unit to make the entire procedure discrete. Positive integers n=1, 2, 3, ..., N are used to indicate the $1^{st}, 2^{nd}, 3^{rd}, \ldots, N^{th}$ time slot, and $I_n$ is used to indicate the status of the shared medium at the nth slot, for example, $I_n=1$ when busy and $I_n=0$ otherwise. The back-off slot count of station i at the nth time slot is denoted as $slot_i(n)$. Four elements characterize a given back-off method as follows: Suppose that a new back-off round starts from the $n_0$th time slot.

1) A back-off space, denoted as S(e), is a set consisting of possible values for setting the initial back-off slot count. The term e represents those events that may cause changes to the back-off space. For example, in the BEB algorithm, the back-off space is the contention window, whereas e can be the status of the last transmission. When e={the last transmission is unsuccessful}, then the current back-off space will change as S(e)=Min(2*S'(e'), CWmax), where S'(e') is the back-off space during the last transmission. In the DEB algorithm, the back-off space is equal to the number of stations, and e represents the event of station joining or leaving.

2) The slot count selection function, denoted as $f$, is the means by which a station selects a value from the back-off space S(e) in order to initialize the back-off slot counter, i.e., $$slot_i(n_0)=f(S(e)). \quad (1)$$

In the BEB algorithm, $f$ is a function that will randomly select an element from the back-off space S(e), whereas in the DEB algorithm, there is only one choice for selection, thus $f(S(e))=S(e)=x$, where x is the single element in the set S(e).

3) The slot count decreasing function, denoted as g, is the means by which a new slot count is derived from the old slot count when an idle time slot elapses. In both BEB and DEB algorithms, when $I_{n+1}=0$, $$slot_i(n+1)=g(slot_i(n))=slot_i(n)-1. \quad (2)$$

4) The transmission triggering condition is the condition, which when satisfied, triggers a frame transmission over the shared medium. In both BEB and DEB, this condition is given by $$slot_i(n)=0. \quad (3)$$

To overcome issues such as backward compatibility and dependability that have been raised regarding the DEB method of Applicant's earlier applications, a new back-off method denoted relaxed DEB (R-DEB) herein is described. The R-DEB method of the present invention permits backward compatibility with previous standards (IEEE 802.11) while making the back-off slot count as deterministic as possible in that context.

In the R-DEB method of the present invention instead of controlling the timing of medium access by adjusting the size of back-off window (or back-off space), one or more appropriate critical points in the back-off window are located and used as the transmission triggers while fixing the size of the back-off window. More specifically, for a back-off round, the R-DEB method has made the following modifications over the DEB method of Applicant's earlier applications:

1) The single element in the back-off space S(e) is now restricted to a fixed value M regardless of the event e. The parameter M is predetermined and large enough to hold all communication stations in the network But less than the number of IP addresses available based on a maximum size of the address space. Without manual configuration or explicit notification by a central authority, for a long period, this parameter is kept unchanged. Note that in the DEB method, the single element of S(e) represents the number of communicating stations in the network, which dynamically changes as stations join or leave the network.

2) The transmission triggering condition has been changed. In the R-DEB method of the present invention, a set $Q_T$ consisting one or more critical points is maintained by each communicating station to trigger new transmission attempts. Each element in the $Q_T$ is a nonnegative integer no greater than M. Each element is used for the transmission triggering condition, given by, $$slot_i(n)=k, k \in Q_T \quad (4).$$

Equation (4) illustrates that with the decreasing of the back-off slot count from the maximum value M to the minimum value 0, the station can have multiple opportunities to trigger frame transmissions, where the slot count matches an element of the triggering set $Q_T$. Note that in both the DEB method and other random back-off methods, a station usually has to count down its back-off slot counter to zero before it is allowed to initiate a frame transmission. In the R-DEB method of the present invention, a station can be granted multiple opportunities for frame transmissions anywhere in the slot counter decrementing operation whenever a critical value is reached.

3) The other two elements, the slot count selection function $f$ and decreasing function g remain the same as in the original DEB method.

In the R-DEB method, a critical issue is how to determine and maintain the triggering set $Q_T$. Note that for an element k in the set $Q_T$, the value of k actually indicates the exact time slot in which the current station will attempt to access the medium. For example, if the current time slot is n, then after m time slots, the triggering condition (4) will be satisfied and a transmission is triggered if there are pending frames in the sending/transmission buffer, where m is given by, $$m \equiv \text{slot}_i(n) - k \bmod(M), 0 \leq m < M \quad (5)$$

If there are no frames pending, then the station just forgoes this opportunity and counts down its slot count as normal.

Proper selection of the integers from interval [0, M] is very important in order to avoid two stations attempting to access the shared medium simultaneously. Attempt to access the shared medium simultaneously causes network collisions on the channel. Accordingly, a random selection method to determine the triggering set $Q_T$ is now described.

The random selection method of the present invention includes two main parts, random selection for each selecting attempt and p-persistent back-off upon failed transmission attempts. Each time that a station wants to select and insert a new element from interval [0, M] into its triggering set $Q_T$, the station randomly selects a value from these integers available in the interval [0, M] that are currently not in its set $Q_T$. In the alternative, a station can maintain a history of past selections and the results of those selections. A station using the alternative method would select those values that have fewer unsuccessful transmission attempts. For example, if during the recent period when selecting the value k as an element of the $Q_T$, the station encountered more network collisions than other choices, then the station will re-select k as an element/value with a low probability. Hence, a table, histogram, matrix or other means can be maintained for each integer from 0 to M along with the number of failed transmissions during the past period T when using this integer as a transmission trigger. The station would then select an integer with such a probability that it is negative proportional to the number of failed attempts during the past period of fixed length. For example, if r(k) denotes the record for integer k, then the station would select k for the new element of $Q_T$ with a probability $q_k$, which is computed by, $$q_k = \frac{r(k)}{\sum_{j \in Q_T} r(j)} \quad (6)$$

In the R-DEB method of the present invention, upon an unsuccessful frame transmission, the station would delete the corresponding element k with a predefined probability p. That is, a failed transmission would cause the corresponding element k deleted from the triggering set $Q_T$ with a probability p and the station has to select a value as a new element to makeup for the deleted element by the preceding random selection method. This method proceeds persistently until an appropriate element has been selected that yields a successful transmission.

Those integer numbers which possess a low probability of colliding with frame transmissions of other stations should be selected for the triggering set. Once a number has been selected and inserted into the set $Q_T$, it will stay in the set until a collision corresponding to this element occurs. An unsuccessful transmission attempt causes replacement of an element from old to new (replaced by a new one), with a probability of p. It is recommended that the probability p should be carefully chosen to reflect the sensitivity of the triggering set to network collisions and channel errors.

In the R-DEB method of the present invention a new round of back-off is invoked whenever the slot count reaches zero, regardless of the status of sending/transmission queue. When the slot count reaches zero but there is no data to send, the station forgoes this transmission opportunity and proceeds to the next round of back-off by setting the slot count to the maximum M. This mechanism is introduced to preserve the relative relationship between these distributed slot counts during the network's operating procedure. For example, if at the current time slot n, station i has slot count $\text{slot}_i(n)$ and station j has slot count $\text{slot}_j(n)$, and the difference between the two slot counts is given by $\text{slot}_i(n) - \text{slot}_j(n) \bmod(M)$. After 1 time slots, the difference between station i and station j should remain the same $(\text{slot}_i(n) - \text{slot}_j(n)) \equiv (\text{slot}_i(n+1) - \text{slot}_j(n+1)) \bmod(M)$. It should be noted that in the conventional random back-off algorithm, such as BEB, the preceding property may not hold because the decreasing of the back-off slot count would cease when no frame is found in the sending/transmission buffer.

A back-off round starts when a station resets its back-off slot count slot(n) to the fixed number M (note that here n is a variable on the timeline). Using the physical carrier sensing procedure, once the station determines that the shared medium is idle for a time slot, the station will decrease its back-off slot count by one. If this new slot count satisfies the transmission triggering condition of equation (4), the station will get a frame transmission opportunity thus triggering a frame transmission attempt. In other words, a triggering event occurs when the slot count equals any one of the elements of the triggering set $Q_T$, for example slot(n)=k. If no frame is to be sent at this time (there is no frame in the transmission queue/buffer), the station forgoes the opportunity and continues decreasing its slot count. The result of the frame transmission attempt determines whether or not the element k should remain in the triggering set. A successful frame transmission will let this element remain in the triggering set. An unsuccessful frame transmission will, with a probability p, trigger an element substitution procedure that replaces the old element k with a new element k' which is obtained using the above described random selection algorithm.

This procedure continues until the slot count reaches zero, which will cause the station to restart a new back-off round by resetting the slot count to M. It should be clear that in the R-DEB algorithm, there is no strict inter-relationship between the slot counts of any two stations. For example, if station i has slot count $\text{slot}_i(n)=0$ at the nth slot count, then at this time, another station j can have slot count with any valid value, i.e., $\text{slot}_j(n)=x$, $x \in (0, M)$.

Note that in the DEB algorithm of Applicants' earlier applications, there should be a mutual exclusivity property between slot counts in the network. In the DEB method each station has been assigned an exclusive/unique identifier, which is based on the number of communicating stations in the network. Hence, in the R-DEB algorithm, each station has a triggering set which is randomly selected, which facilitates network flexibility and easy deployment.

On the other hand, a loose round robin service among the stations in the R-DEB method of the present invention has been formed. From the viewpoint of the shared network medium, over time, the medium is multiplexed by stations in a way that each station dictates time slots that it intends to occupy by determining the triggering set. The selection of elements for the triggering set by the random selection algorithm has the effect that a station is inclined to select those time slots that are not currently used by other stations (in which collisions may occur). Over the short term, the selection of new triggering elements may lead to network collisions and cause fluctuation of the triggering sets over the network, in which case the R-DEB algorithm has degenerated to a random back-off algorithm and hence degrades the network performance. However, over the long run, it can be easily observed that the network will reach a steady state and each station can access the medium deterministically with a low probability of network collisions (considering the carrier sensing errors). At that point, a station's triggering set would also reach a steady state because each element of the set is assumed to be optimal in that its use will not cause collisions.

Figure 2A:
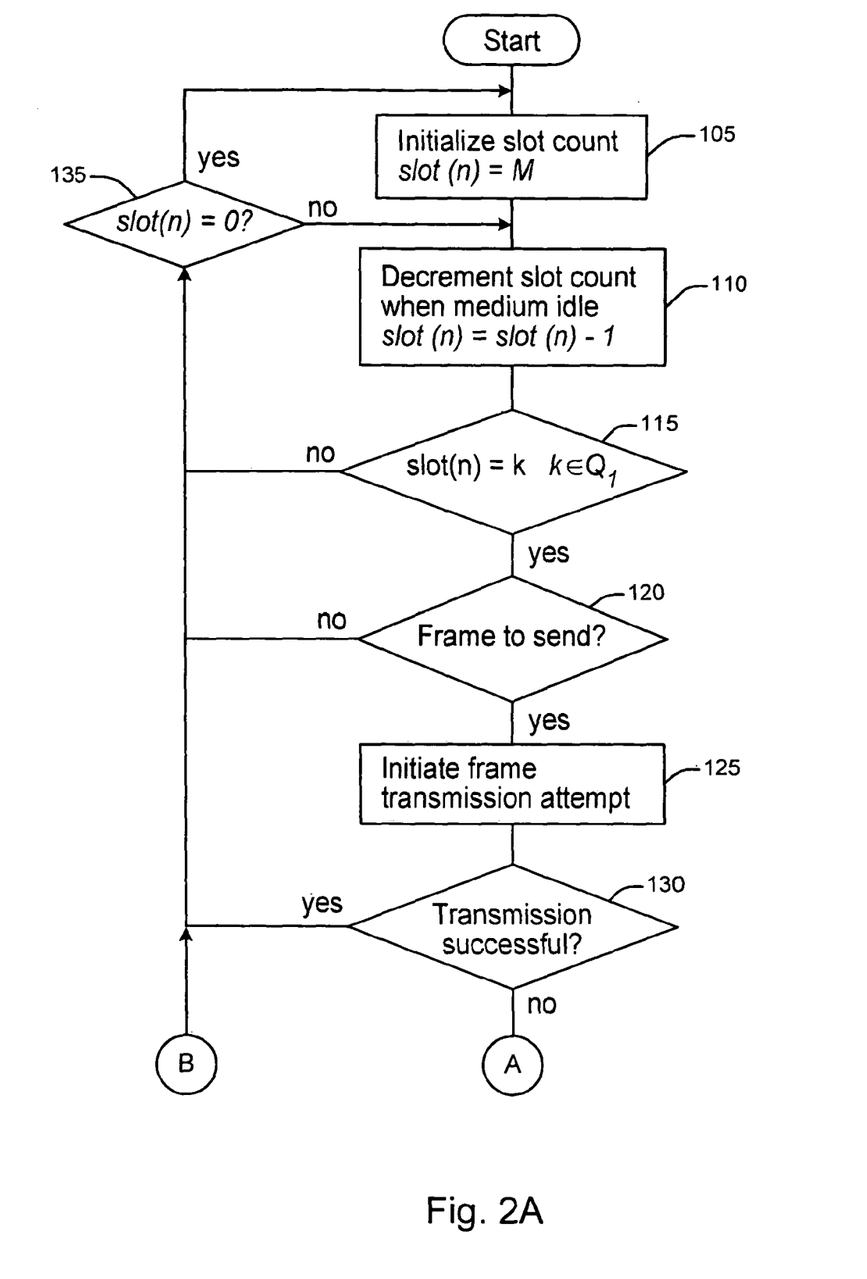
FIGS. 2A and 2B together are a flowchart of an exemplary embodiment of the relaxed deterministic back-off method of the present invention.
Figure 2B:
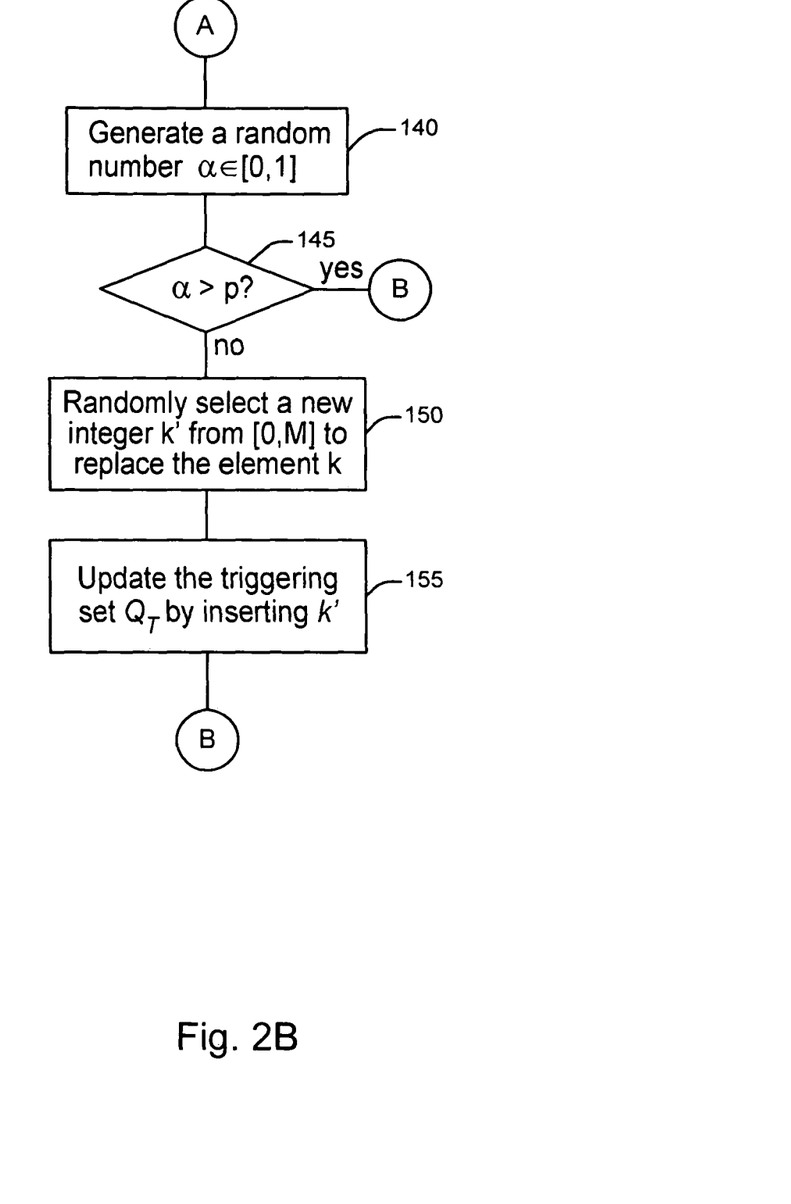

FIGS. 2A and 2B together are a flowchart of an exemplary embodiment of the R-DEB method of the present invention. At 105 the slot count is initialized to M (slot(n)=M). At 110, the station/node monitors the medium and when the medium is idle the slot count is decremented (slot(n)=slot(n)−1). A test is performed at 115 to determine if the slot count is equal to a triggering event k where k ∈ $Q_T$ where $Q_T$ is the set of triggering events for this station/node. If the slot count is equal to a triggering event then a test is performed at 120 to determine if the station/node has a frame to send/transmit. If the station/node has a frame to transmit then a frame transmission attempt is initiated at 125. A test is performed at 130 to determine if the frame transmission attempt was successful. If the frame transmission attempt was successful processing continues to 135 where a test is performed to determine if the slot count has reached zero (slot(n)=0). If there was no frame to transmit (120) then processing continues to 135. If the slot count is not equal to a triggering event (115) then processing continues to 135. If the frame transmission attempt was unsuccessful (130) then processing continues to 140 where a random number a is selected from the interval [0,1]. A test is performed at 145 to determine if the random number a is greater than a predetermined probability p, which can be thought of as a predetermined threshold. If the random number a is less than or equal to p then randomly select a new triggering event k' from the set [0,M] to replace k, where k ∈ $Q_T$. At 155 the triggering set $Q_T$ is updated by inserting k' into the triggering set. If the random number a is greater than p then processing continue to 135.

In the R-DEB method of the present invention, the parameter M is the only shared/common information for all stations, just like the CWmin and CWmax in the BEB algorithm. It is predetermined in advance of the network deployment, e.g., in peer-to-peer communication networks, or it can be a configurable parameter distributed by the central coordinator, e.g., in infrastructure based networks. It should be set to a proper value to accommodate sufficient medium access requests from stations. A larger M provides more opportunities, in terms of available time slots, for stations to access the network, while smaller M improves the efficiency of multiplexing but increases the possibility of network collisions. If M is too large then there may be a number of empty slots resulting in wasted bandwidth. M should be no less than the number of current stations in the network, so as to make it possible for each station to have one time slot for its access. For example, for an access network serving homes, M=128 should be adequate, and for an access network in hot spots, M=256 can be appropriate for most applications.

Figure 3:
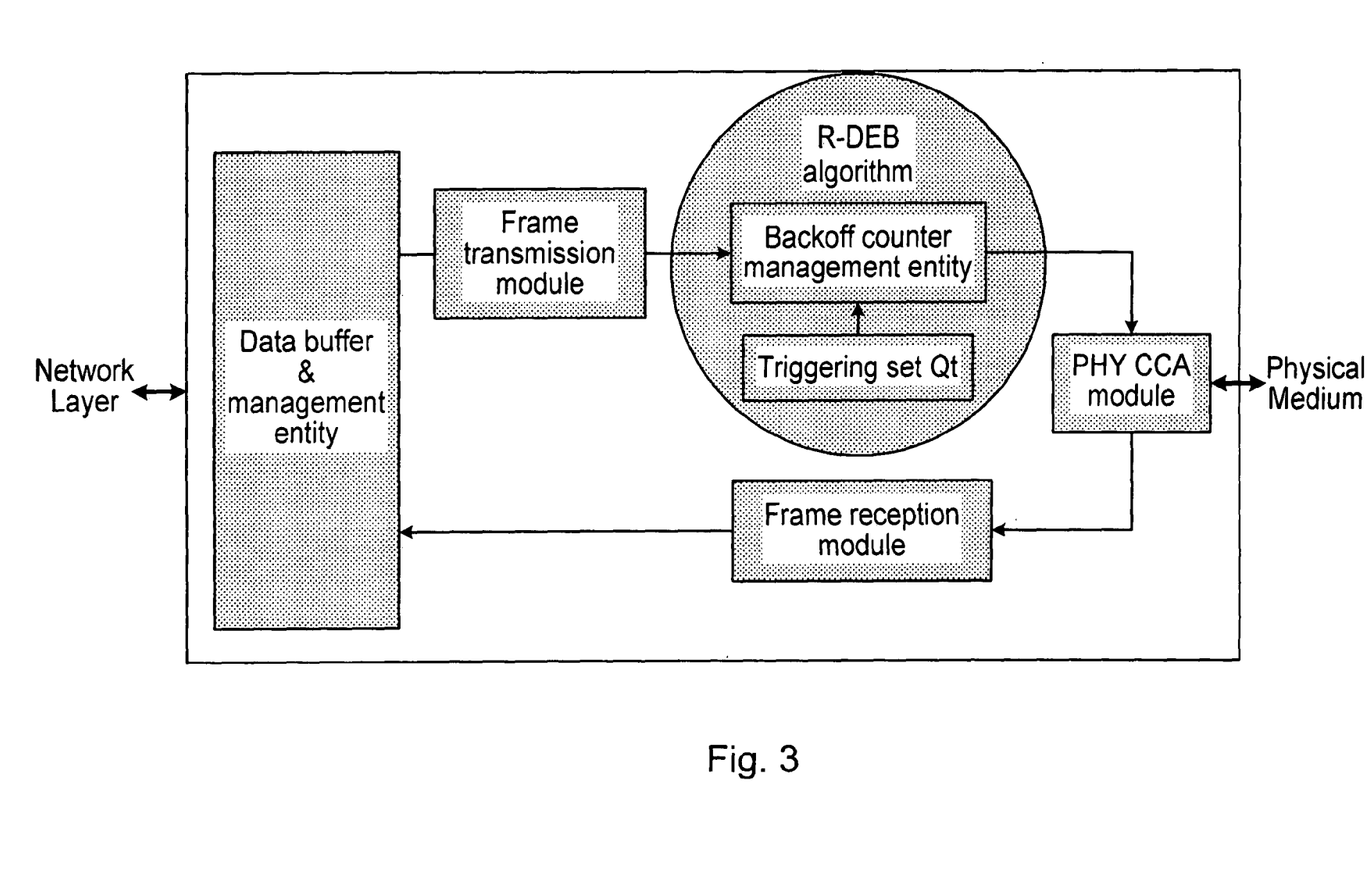
FIG. 3 is a block diagram of an exemplary implementation of the relaxed deterministic back-off method of the present invention.

FIG. 3 is a block diagram of an exemplary implementation of the relaxed deterministic back-off method of the present invention. The R-DEB method of the present invention may be implemented, for example, on a network adapter including two main components. One component is the back-off counter management entity, which controls the decreasing and resetting of the back-off slot counter based on the physical controlled channel access (CCA) status. Unlike conventional random back-off algorithms (such as BEB), in R-DEB decreasing of the slot counter should continue regardless of whether or not the apparatus/node has data to send. A second component is the triggering set $Q_T$ management entity, which is responsible for determining and maintaining a proper triggering set for the R-DEB method. The random selection method runs here to select new elements from the back-ups (k' from the set [0,M]) and remove old elements (k) because of failed transmission attempts.

In the R-DEB method of the present invention, both the timing and the frequency of medium access are completely determined by the triggering set $Q_T$. The differences between those elements of the set $Q_T$ determine the time interval, in terms of number of time slots, between corresponding transmission opportunities. The size of the set $Q_T$ determines the number of transmission opportunities in each back-off round. The timing can be carefully selected and the frequency of medium access can be properly adjusted in the interval [0, M] in order to provide better network services for upper layer applications. For example, in multi-media communication circumstances, it would be beneficial to distribute the frequency of medium access uniformly in the interval [0, M] to reduce the delay jitter.

The DEB algorithm of Applicants' earlier applications is not compatible with the traditional IEEE 802.11 medium access mechanism, which is based on the BEB algorithm. However, the R-DEB method of the present invention is compatible with conventional IEEE 802.11. A legacy station can use its normal BEB algorithm to access the medium in the R-DEB network. The reason behind this is that the R-DEB algorithm adopts randomized distribution of the timing of medium access (by random selection of the triggering set) and network collisions in conjunction with a recovery mechanism are allowed in the R-DEB method of the present invention.

In an ideal network environment without channel errors and physical sensing errors, while the R-DEB algorithm has network collisions but the DEB algorithm is collision-free. However, because collisions happen only during the random selection procedure for the triggering set when a station wants more opportunities for data/frame transmission, it can be expected that over the long run, there are far fewer collisions occurring in the network as the triggering set of a station will reaches a steady state. Hence, compared with the BEB algorithm, the R-DEB method suffers less collision overhead.

Because of the existence of network collisions, the R-DEB method has some degradation in its network efficiency particularly when the traffic load of each station is very heavy. But the reward for introducing the randomness feature into the method is that, the R-DEB operates in a much more robust and flexible fashion. The R-DEB method is not as sensitive to the physical sensing errors and channel errors as the DEB algorithm. And its flexibility lies in that each station can adaptively and freely increase its opportunity for frame transmission by enlarging its triggering set, whereas the DEB algorithm needs to perform a information synchronization procedure before it can achieve this goal.

The R-DEB method is executed on each station in a completely distributed fashion in that it does not rely on any central infrastructure for management, similar to the BEB algorithm. The DEB algorithm requires support from central infrastructure to synchronize information over the network. Thus, from this viewpoint, the R-DEB method is more scalable than the DEB algorithm.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method, said method comprising:
   initializing said slot count;
   decrementing said slot count when a communication medium is idle;
   transmitting data, by a terminal over a shared contention-based wireless communication medium using a media access control protocol, if a slot count is equal to a triggering event, wherein said slot count is a count of a number of time slots in a back-off cycle and wherein back-off cycle has a fixed number of said time slots and wherein said triggering event is one of a possible plurality of transmission opportunities for said terminal and wherein said back-off window is fixed;
   selecting a random number if said data transmission was not successful;
   comparing said random number to a threshold;
   selecting a new triggering event responsive to a failed data transmission, wherein said new triggering event is selected based on said comparison; replacing said triggering event with said new triggering event; and
   reusing said triggering event in a subsequent back-off cycles responsive to a successful data transmission, said successful data transmission is a data transmission that was acknowledged in a previous back-off cycle.

2. The method according to claim 1, further comprising:
   determining if said slot count is equal to said triggering event; and
   determining if there is data to transmit if said slot count is equal to said triggering event.

3. The method according to claim 1, wherein said random number is in a first interval.

4. The method according to claim 1, wherein said new triggering event is selected from a set of integers in a second interval.

5. The method according to claim 4, wherein a greatest integer in said second interval is one of less than and equal to a maximum size of an address space.

6. The method according to claim 1, wherein said communication medium is wireless.

7. The method according to claim 1, wherein a condition of said communication medium being idle is based on a result of one of physical carrier sensing and virtual carrier sensing.

8. An apparatus, comprising:
   means for initializing said slot count;
   means for decrementing said slot count when a communication medium is idle;
   means for transmitting data, by a terminal over a shared contention-based wireless communication medium using a media access control protocol, if a slot count is equal to a triggering event, wherein said slot count is a count of a number of time slots in a back-off cycle and wherein said back-off cycle has a fixed number of said time slots and wherein said triggering event is one of a possible plurality of transmission opportunities for said terminal and wherein said back-off window is fixed;
   means for selecting a random number if said data transmission was not successful;
   means for comparing said random number to a threshold;
   means for selecting a new triggering event responsive to a failed data transmission, wherein said new triggering event is selected based on said comparison; replacing said triggering event with said new triggering event;
   means for replacing said triggering event with said new triggering event; and
   reusing said triggering event in a subsequent back-off cycles responsive to a successful data transmission, said successful data transmission is a data transmission that was acknowledged in a previous back-off cycle.

9. The apparatus according to claim 8, further comprising:
   means for determining if said slot count is equal to said triggering event; and
   means for determining if there is data to transmit if said slot count is equal to said triggering event.

10. The apparatus according to claim 8, wherein said random number is in a first interval.

11. The apparatus according to claim 8, wherein said new triggering event is selected from a set of integers in a second interval.

12. The apparatus according to claim 11, wherein a greatest integer in said second interval is one of less than and equal to a maximum size of an address space.

13. The apparatus according to claim 8, wherein a condition of said communication medium being idle is based on a result of one of physical carrier sensing and virtual carrier sensing.

* * * * *